(12) United States Patent
Ishida et al.

(10) Patent No.: US 6,383,974 B1
(45) Date of Patent: May 7, 2002

(54) HYDROREFINING CATALYST AND METHOD FOR MANUFACTURING HYDROREFINING CATALYST

(75) Inventors: Katsuaki Ishida; Ryutaro Koide, both of Toda (JP); Koichi Matsushita, Salmiya (KW)

(73) Assignee: Japan Energy Corporation, Tokyo (JP)

( * ) Notice: Subject to any disclaimer, the term of this patent is extended or adjusted under 35 U.S.C. 154(b) by 0 days.

(21) Appl. No.: 09/512,879

(22) Filed: Feb. 25, 2000

Related U.S. Application Data (63) Continuation of application No. PCT/JP98/03786, filed on Aug. 26, 1998.

(30) Foreign Application Priority Data

Aug. 26, 1997 (JP) .............................................. 9-243529

(51) Int. Cl.[7] .......................... B01J 23/00; B01J 23/40; B01J 23/58; B01J 23/44; B01J 23/42
(52) U.S. Cl. ...................... 502/305; 502/314; 502/315; 502/316; 502/317; 502/320; 502/322; 502/323; 502/327; 502/330; 502/333; 502/334; 502/335; 502/336; 502/337; 502/338; 502/339
(58) Field of Search .................................. 502/305, 308, 502/314, 315, 316, 317, 320, 322, 323, 327, 330, 333, 334, 335, 336, 337, 338, 339, 104, 210, 211, 213

(56) References Cited

U.S. PATENT DOCUMENTS

| | | | | |
|---|---|---|---|---|
| 4,127,591 A | * | 11/1978 | Kamimura et al. | 260/346.75 |
| 4,480,050 A | * | 10/1984 | Brennan | 502/330 |
| 4,752,623 A | * | 6/1988 | Stevens et al. | 518/714 |
| 4,760,045 A | | 7/1988 | Oishi et al. | |
| 4,786,625 A | * | 11/1988 | Imai et al. | 502/326 |
| 4,873,217 A | * | 10/1989 | Kawajiri et al. | 502/311 |
| 4,892,856 A | * | 1/1990 | Kawajiri et al. | 502/247 |
| 4,916,103 A | * | 4/1990 | Martan et al. | 502/212 |
| 5,012,027 A | * | 4/1991 | Abrevaya et al. | 585/443 |
| 5,348,928 A | * | 9/1994 | Kukes et al. | 502/306 |
| 5,464,802 A | * | 11/1995 | Gubitosa et al. | 502/331 |
| 5,571,771 A | * | 11/1996 | Abel et al. | 502/330 |
| 5,733,839 A | * | 3/1998 | Espinoza et al. | 502/336 |
| 5,739,075 A | * | 4/1998 | Matusz | 502/302 |
| 5,759,951 A | * | 6/1998 | Zhao et al. | 502/344 |
| 5,808,136 A | * | 9/1998 | Tacke et al. | 560/243 |
| 5,834,394 A | * | 11/1998 | Chen et al. | 502/302 |
| 5,856,259 A | * | 1/1999 | Watanabe et al. | 502/305 |
| 5,885,917 A | * | 3/1999 | Ohdan et al. | 501/153 |
| 6,184,173 B1 | * | 2/2001 | Hibst et al. | 502/300 |

FOREIGN PATENT DOCUMENTS

| | | |
|---|---|---|
| EP | A2204314 | 12/1986 |
| JP | A58-153539 | 9/1983 |
| JP | A61-283351 | 12/1986 |
| JP | 929094 | 2/1997 |
| JP | A9-240094 | 9/1997 |
| JP | 10165814 | 6/1998 |
| JP | 200087047 | 3/2000 |

* cited by examiner

*Primary Examiner*—Steven P. Griffin
*Assistant Examiner*—Cam N. Nguyen
(74) *Attorney, Agent, or Firm*—Birch, Stewart, Kolasch & Birch, LLP (57) ABSTRACT

Hydrorefining catalyst contains 0.1 to 25 wt % in total of at least one hydrogenation active metal element selected from elements of Group 6, Group 8, Group 9, and Group 10 of the Periodic Table, and 0.1 to 3 wt % potassium on a carrier formed of porous inorganic oxide. The concentration distribution of the hydrogenation active metal element is higher in the central part than in the peripheral part of the catalyst, and the concentration distribution of potassium is higher in the peripheral part than in the central part of the catalyst. The pores on the outside surface of the catalyst are not plugged by the metal content of hetero compounds and hetero compounds can be efficiently diffused to inside the catalyst. As a result, long-term retention of a state of high activity is possible.

11 Claims, 5 Drawing Sheets

Fig. 1

POSITION r IN THE DIAMETRICAL DIRECTION
OF THE PELLET CROSS SECTION (mm)

Fig. 2

POSITION r IN THE DIAMETRICAL DIRECTION
OF THE PELLET CROSS SECTION (mm)

HYDROREFINING CATALYST AND METHOD FOR MANUFACTURING HYDROREFINING CATALYST

This application is a continuation application of International Application No. PCT/JP98/03786 filed on Aug. 26, 1998 based on Japanese Patent Application No. 9-243529 filed on Aug. 26, 1997.

BACKGROUND OF THE INVENTION

1. Field of the Invention

The present invention pertains to a hydrorefining catalyst and a hydrorefining method using the catalyst, as well as a method of producing the catalyst, and in particular, to hydrorefining for removal of the metal content, such as nickel, vanadium, etc., contained in heavy oil.

2. Description of the Related Art

In general, it is necessary to pre-remove the metal content, such as vanadium, nickel, etc., that poisons desulfurizing and denitrifying active sites when performing hydrorefining, such as desulfurization and denitrification, etc., of heavy oil. In particular, when heavy oil having a high metal content, such as residue, etc is hydrorefined, much of the metal content accumulates in the peripheral part surface of the catalyst pellet, plugging the pores thereof there. Therefore, oil and hydrogen are prevented from diffusing to inside the catalyst pellet and the catalyst loses its activity. As a result, the catalyst must be replaced.

There is a demand for development of a long-life catalyst with which the metal content of the above-mentioned feed heavy oil is removed and there is long-term retention of high activity in order to continuously hydrorefine heavy oil with a high metal content, such as residue from atmospheric distillation and residue from vacuum distillation, etc., efficiently and with stability. Therefore, life is prolonged by, for instance, making pore diameter of the catalyst carrier uniform and large so that molecules comprising the metal content of the feed heavy oil are diffused to inside the catalyst and the active sites inside the catalyst are efficiently used. Moreover, a bimodal carrier having pores of 1,000 Å or larger called macropores as well as mesopores is being used as a catalyst carrier in order-to facilitate diffusion to the inside.

Furthermore, adjustment of the type, concentration, and combination of supported metals is also being used as .another method of prolonging catalyst life. In addition, methods are also being studied whereby the plugging that is caused by accumulation of metal content is prevented by using a combination of several types of catalysts with different pore distributions, supported metals, etc. However, even these methods cannot thoroughly satisfy the above-mentioned demand.

Japanese Patent Application Laid-Open No. 58-153539 discloses a hydrodesulfurization catalyst, characterized in that it is made from a porous aluminum carrier and molybdenum and phosphorus, and further, cobalt and/or nickel, to which at least one selected from the group consisting of potassium, rubidium, and cesium has further been added, supported on this carrier. This publication explains that activity is markedly improved simply by adding a trace of potassium, rubidium, or cesium to the catalyst system, but there is no description of the concentration distribution of the potassium in the catalyst.

Japanese Patent Application Laid-Open No. 61-283351 discloses a catalyst where the concentration of the hydrogenation active metal elements in the central part of the catalyst pellet is higher than the concentration in the peripheral part. It explains that as a result, accumulation of metal in the peripheral part of the catalyst pellet is prevented and life is prolonged. However, there is no description of a means other than the higher concentration of the hydrogenation active metal elements in the central part of the catalyst pellet for preventing metal accumulation.

Japanese Patent Application Laid-Open No. 9-240094 discloses that alkali metal in a catalyst supporting mainly an alkali metal such as potassium, etc., is stabilized when a non-metal element, such as phosphorus, etc. is also present. It explains that when molybdenum, nickel, etc. are present, the alkali metal is mainly present in the peripheral part edges of the catalyst. However, there is no indication as to the concentration distribution of the molybdenum, nickel, etc., in the catalyst. Furthermore, although Example 13 of Japanese Patent Application Laid-Open No. 9-240094 discloses a method of producing a catalyst containing molybdenum and potassium, catalyst carrier is first sprayed with ammonium molybdate and is then sprayed with a solution containing phosphoric acid and potassium nitrate. A catalyst with the molybdenum concentration distribution specified by the present invention is not obtained, even if this production method disclosed in Japanese Patent Application Laid-Open No. 9-240094 is used.

SUMMARY OF THE INVENTION

The present invention solves the above-mentioned problems of conventional technique, its object being to present a hydrorefining catalyst with which the fine pores in the catalyst are rarely plugged by the metal content and which can retain high activity for a long period of time. In particular, the object of the present invention is to present a hydrorefining catalyst with which the fine pores on the outside surface of the catalyst are not plugged by the metal content of hetero compounds, even when hydrocarbon oil with an asphaltene content of 2 wt % or more is hydrorefined, making it possible for the hetero compound to efficiently diffuse to inside the catalyst, and as a result, long-term retention of a state of high activity can be accomplished, a method of producing the same catalyst, and a hydrorefining method using the same catalyst.

As a result of performing intensive studies in order to accomplish the above-mentioned object, the inventors achieved the present invention upon discovering that catalyst activity is improved and life is prolonged when a potassium component for reducing molecular weight of compound containing hetero elements (sulfur, vanadium, nickel, etc.) and at least one type of hydrogenation active metal element selected from elements of Group 6, Group 8, Group 9, and Group 10 of the Periodic Table, which have excellent ability in terms of hydrogenation of hetero element-containing compounds, are present at a specific distribution inside the catalyst pellets.

In accordance with the first aspect of the present invention, a hydrorefining catalyst is presented, comprising a carrier consisting of porous inorganic oxide, 0.1 to 25 wt % of at least one hydrogenation active metal element selected from Group 6, Group 8, Group 9, and Group 10 of the Periodic Table (0.1 to 25 wt % in total if two or more types of hydrogenation active metal elements are contained), and 0.1 to 3 wt % potassium, wherein the concentration distribution of the above-mentioned hydrogenation active metal element(s) is even higher in the central part than in the peripheral part of the catalyst and the concentration distribution of the above-mentioned potassium is even higher in the peripheral part than in the central part of the catalyst. By means of the catalyst of the present invention, in which the concentration of hydrogenation active metal element(s) is distributed higher in the central part than in the peripheral part of the catalyst, vanadium and nickel that have been hydrocracked from feed oil can be accumulated to fullest measure in the peripheral part, as well as in the central part, of the catalyst, as shown in the examples that follow. Therefore, it is possible to realize extremely high demetalizing activity of the catalyst and to retain this activity over a long period of time.

The catalyst of the present invention preferably has a distance from the outside surface to the center of the catalyst of 0.3 to 1.8 mm. Moreover, this catalyst preferably contains 2 to 15 wt % in total of hydrogenation active metal element (s) and 0.1 to 3 wt % potassium. Furthermore, it is preferred that the catalyst of the present invention contains phosphorus, and the phosphorus may be distributed more in the peripheral part than in the central part of the catalyst. In addition, it is preferred that the above-mentioned hydrogenation active metal element be molybdenum or tungsten.

In accordance with the second aspect of the present invention, a multi-bed catalytic reactor is presented, comprising at least first and second catalyst beds, wherein the first catalyst bed contains the catalyst of the present invention and the second catalyst bed contains demetalizing catalyst or desulfurizing catalyst.

In accordance with the third aspect of the present invention, a hydrorefining method is presented, wherein the hydrorefining catalyst of the present invention is brought into contact with hydrocarbon oil, particularly hydrocarbon oil with an asphaltene content of at least 2 wt %, in the presence of hydrogen. By means of this method, demetalization or desulfurization can be conducted more efficiently by further bringing hydrocarbon oil that has been contacted with the above-mentioned hydrorefining catalyst into contact with demetalizing or desulfurizing catalyst.

In accordance with the fourth aspect of the present invention, a method of producing a hydrorefining catalyst is presented, comprising the steps of impregnating porous inorganic oxide carrier with a phosphoric acid compound;

impregnating the porous inorganic oxide carrier with potassium compound; and impregnating the porous inorganic oxide carrier with at least one hydrogenation active metal element selected from elements of Group 6, Group 8, Group 9, and Group 10 of the Periodic Table, wherein the above-mentioned step of impregnation with the phosphoric acid compound is performed first or simultaneously with the other two steps, or it is performed simultaneously with one of the two steps and before the other step. For instance, the carrier is impregnated with the phosphoric acid compound and the above-mentioned hydrogenation active metal element together, and then the carrier is impregnated with the potassium compound.

DESCRIPTION OF PREFERRED EMBODIMENT OF THE INVENTION

An oxide of an element of Group 2, Group 4, Group 13, and Group 14 can be used as the porous inorganic oxide carrier of the present invention (Periodic Table according to IUPAC, 1990 recommendation). Of these, silica, alumina, magnesia, zirconia, boria, calcia, etc., are preferred, and these can be used alone or in combination of two or more. Alumina (with a crystal structure such as $\gamma$, $\delta$, $\eta$, x, etc.), silica-alumina, silica, alumina-magnesia, silica-magnesia, and alumina-silica-magnesia are particularly preferred. A carrier where alumina accounts for 50 wt % or more of the catalyst in terms of $Al_2O_3$ weight is suitable.

Molybdenum and/or tungsten are suitable as the hydrogenation active metal elements of Group 6, Group 8, Group 9, and Group 10 supported on the above-mentioned carrier of the catalyst of the present invention. Molybdenum is particularly preferred. In addition to these elements, the catalyst can also contain nickel and/or cobalt. The hydrogenation active metal element may be supported on the carrier in the form of metal, oxide, or sulfide. The total hydrogenation active metal element content in terms of metal may be within a range of 0.1 wt % to 25 wt % per catalyst weight. A range of 0.5 wt % to 15 wt %, further, a range of 2.5 wt % to 15 wt %, is particularly desirable. If the content of these elements is less than this range, the effect of removing the hetero group-containing compound in the hydrocarbon oil will be reduced and thorough desulfurization, denitrification, or demetalization will not be realized. If the total content of hydrogenation active metal element in terms of metal exceeds 25 wt % per catalyst weight, catalyst production cost will be enormous and the method will be uneconomic.

The catalyst further contains a 0.1 to 3 wt % potassium as constituting component of the catalyst. If this potassium content is less than 0.1 wt %, the demetalizing activity will be lower, while if the potassium content exceeds 3 wt %, the desulfurizing activity or denitrifying activity will be lower.

In terms of the effect of reducing molecular weight of the hetero element-containing compounds in the hydrocarbon oil in particular, it is preferred that the potassium content be 0.3 wt % or higher, particularly 0.4 wt % or higher. The potassium is usually contained in the catalyst in the form of a compound such as an oxide, etc., for instance, potassium hydroxide or potassium oxide.

The concentration distribution of the catalyst of the present invention is adjusted so that the concentration of at least one type of hydrogenation active metal element component selected from Group 6, Group 8, Group 9, and Group 10 of the Periodic Table is higher in the central part of the catalyst than in the peripheral part, and the concentration of potassium is higher in the peripheral part of the catalyst than in the central part. That is, when the cross section of a catalyst pellet is observed, the concentration of the hydrogenation active metal element component is higher in the central part than in the peripheral part surface and it is generally referred to as an "egg-yolk" type distribution. The concentration of potassium is higher near the outside surface than in the central part and is generally referred to as an "egg-shell" type distribution.

The concentration of hydrogenation active metal element component is lower in the peripheral part in the cross section of the catalyst pellet of the present invention. This is done so that the metal content will not accumulate inside the pores in the peripheral part of the pellet and inhibit diffusion with demetalization during the course of diffusion of the metal-containing compound in the hydrocarbon oil to inside the catalyst pellet. As a result, the catalyst is effectively used, up to the inside of the pellet, in demetalization and desulfurization.

With respect to the concentration in the peripheral part of the pellet and in the central part in the cross section of the catalyst pellet, when a concentration of the hydrogenation active metal element component in the peripheral part is Ao and a concentration of the hydrogenation active metal component in the central part is Ai, a value of Ao/Ai is preferably within a range of 0 to 0.8, particularly 0 to 0.6. In the present specification, the term "the outside of the catalyst" means the region within a range of 0 to 0.2R from the outside surface of the catalyst, and the term "the center of the catalyst" means the region within a range of 0.8R to 1.0R from the outside surface of the catalyst, when R represents the distance from the outside surface to the center of the catalyst. When the catalyst can be approximated as a rotation symmetrical shape, the term "the peripheral part of the catalyst" means the region within a range of 0 to 0.2R from the outside surface of the catalyst, while the term "center of the catalyst" symmetry means the region within a range of 0.8R to 1.0R from the outside surface of the catalyst, when R represents the distance from the outside surface to the center of the catalyst in the cross section perpendicular to the axis of symmetry.

Moreover, the term "center of the catalyst" in the present specification means the point, or aggregate of points, inside the catalyst farthest away from the outside surface of the catalyst. When the catalyst can be approximated as a rotation symmetrical shape, the term "center of the catalyst" means the point, or aggregate of points, within the catalyst farthest away from the outside surface of the catalyst in the cross section perpendicular to the axis of symmetry. For instance, if the catalyst (pellet) is spherical, the center of the catalyst is the center of the sphere. If the catalyst is cylindrical, the center of the catalyst means the aggregate of points which are farthest from the outside surface and are on the axis of rotation. If the catalyst is tube-shaped, the center of the catalyst means the aggregate of points which are farthest from the outside surface and present on the concentric circles of the tube. If the catalyst is trilobular or quadrilobular, the point farthest from the outside surface varies depending on the degree to which the lobes of the trilobe or the quadrilobe overlap. That is, when the degree to which the lobes of the trilobe or quadrilobe overlap is low, the point farthest from the outside surface will be in the central part of each lobe, but if the degree to which the lobes of the trilobe or the quadrilobe overlap is high, the point farthest from the outside surface will be on the axis of rotation of the trilobular or quadrilobular catalyst.

The concentration of the hydrogenation active metal component can be determined from the integral of the detected intensity within a specific range when beam analysis of the cross section of the catalyst pellet is performed by an analysis method that is appropriate for quantitative analysis of trace element contents, such as EPMA, Auger electron spectrometry, or secondary ion mass spectrometry (SIMS). Furthermore, when the catalyst pellets can be approximated as a shape with rotation symmetry but without a hollow part, the cross section to be analyzed is the cross section perpendicular to this axis of symmetry, with this axis of symmetry being the center of the cross section.

Moreover, it is preferred that the maximum concentration peak of the hydrogenation active metal element component be near the center of the above-mentioned cross section of the catalyst pellet. This is in order to improve the ability to remove the hetero elements from the molecules that have diffused up to inside the pellet. The results are improved if the position of the maximum concentration peak of the hydrogenation active metal element component is within a range of $r_{MAX}/R=0.5$ to 1, particularly 0.7 to 1, in the above-mentioned cross section of the catalyst pellet when the distance from the outside surface to the center is R and the distance from the outside surface to the position of the maximum concentration peak is $r_{MAX}$. An $r_{MAX}/R<0.5$ is undesirable because demetalizing activity around outside of the pellet will be high and the center of the pellet will not participate in the reaction. Furthermore, with respect to the position of the typical maximum concentration peak, the peak position can be determined by dividing distance R from the outside surface to the center into 50 to 200 sections and calculating the average concentration of hydrogenation active metal element of the catalyst pellet in each section.

Furthermore, it is preferred that the potassium maximum concentration peak of the catalyst of the present invention be near the outside surface in the above-mentioned cross section of the catalyst pellet. This is done in order to reduce molecular weight using the potassium near the outside surface of the pellet during the course of diffusion of sulfur or compounds with a metal content in the hydrocarbon oil to the inside of the catalyst pellet and as a result, enable molecules that are usually too large for diffusion to be diffused to inside the pellet and removed. Thus, the catalyst can be effectively used, up to the inside of the pellet, for demetalization and desulfurization. When the potassium concentration in the peripheral part (typically the region within a range of 0 to 0.2R from the outside surface, with R being the distance from the outside surface to the center) is Ko and the potassium concentration in the central part (typically, the region within a range of 0.8R to 1.0R from the outside surface, with the distance from the outside surface to the center being R) is Ki, it is preferred that the concentration in the peripheral part of the pellet and in the central part in the cross section of the catalyst pellet is such that the value of Ki/Ko is within a range of 0 to 0.8, particularly within a range of 0 to 0.6. This potassium concentration may be determined by the same analysis methods as in the case of the hydrogenation active metal element component.

The results are improved when the position of this potassium maximum concentration is within a range of $r_{MAX}/R=0$ to 0.5, particularly within a range of 0 to 0.3, in the cross section of the catalyst pellet, with the distance from the outside surface to the position of the maximum concentration peak being $r_{MAX}$. An $r_{MAX}/R>0.5$ is undesirable because it will not be possible to efficiently reduce molecular weight of the hetero compounds near the pellet surface and therefore, it will be difficult for the hetero compounds to diffuse to inside the catalyst pellet.

The hydrogenation active metal element concentration Ao in the peripheral part of the hydrorefining catalyst of the present invention must be lower than the hydrogenation active metal element concentration Ai in the central part, and the potassium concentration Ki in the central part must be lower than the potassium concentration Ko in the peripheral part. As a result, activity of the catalyst, up to the inside of the catalyst pellet, for demetalization and desulfurization can be efficiently used. In concrete terms, a product of the ratio of the hydrogenation active metal element concentration Ao in the peripheral part and the hydrogenation active metal element concentration Ai in the central part and the ratio of the potassium concentration Ki in the central part and the potassium concentration Ko in the peripheral part (Ao/Ai)×(Ki/Ko) of less than 0.6, particularly less than 0.5, is preferred in terms of obtaining high demetalizing activity and desulfurizing activity and long-term retention of these activities.

At the same time, the distance from the outside surface of this catalyst pellet to the center must be 0.3 to 1.8 mm, preferably 0.4 to 1.6 mm, in order to efficiently use the catalyst pellet, up to the inside of the pellet, as a hydrorefining catalyst. If distance exceeds this range, the center of the pellet cannot be used efficiently. If it is less than this range, the necessity for reducing molecular weight of the hetero compound will be low.

In the production of the catalyst of the present invention, there are no special limitations to a method of introducing (a) hydrogenation active metal element(s) and potassium such that the concentration of the hydrogenation active metal element(s) is higher in the central part and the concentration of potassium is higher in the peripheral part of the catalyst pellet. An impregnation method can be used that uses as the impregnating solution an aqueous solution containing, as its common components, an organic acid such as citric acid, tartaric acid, oxalic acid, maleic acid, acetic acid, etc., a mineral acid such as hydrochloric acid, nitric acid, phosphoric acid, etc., and/or inorganic salt such as ammonium fluoride, ammonium chloride, etc., and also contains potassium and a hydrogenation active metal element. In this case, of the above-mentioned organic acids, mineral acids, and inorganic salts, compounds that can be firmly adsorbed on the carrier, particularly phosphoric acid, are preferred. Moreover, a multi-step impregnation method can also be used whereby after the carrier has been impregnated with an aqueous solution containing the above-mentioned organic acid, mineral acid or inorganic salt and hydrogenation active metal element component, it is impregnated with potassium-containing solution. The term "impregnation" means that at least part of the surface of the carrier is wetted with the respective solution. This may be performed by any method, and so-called spraying or immersion are preferred.

In particular, in the method of producing a hydrorefining catalyst wherein porous inorganic oxide carrier is impregnated with at least one type of supporting solution, it is possible to efficiently impregnate in the peripheral part of the catalyst with potassium and the center of the catalyst with hydrogenation active metal element component when the supporting solution that impregnates the carrier first contains phosphoric acid compound and the supporting solution that impregnates the carrier last contains potassium compound. Since the phosphoric acid compound is readily distributed selectively in the peripheral part of the catalyst and the potassium selectively bonds with the phosphorus, it is necessary to impregnate the carrier with the phosphorus component first and then impregnate the carrier with the potassium component last. This will be explained in further detail with an example of a method of producing a catalyst containing potassium and molybdenum as the hydrogenation active metal components. When the alumina carrier is impregnated with phosphoric acid compound first in accordance with the method of the present invention, the phosphoric acid ions are adsorbed on the alumina carrier surface. The phosphoric acid ions (anions) are firmly adsorbed on the alumina carrier surface and therefore, are distributed to a high concentration on the outside surface of the carrier. When the alumina carrier is then impregnated with molybdic acid compound, the molybdic acid ions, which are anions, are electrostatically repulsed by the phosphoric acid ions adsorbed on the outside surface of the alumina carrier and therefore, it appears that they penetrate deep inside the carrier and here are adsorbed by the aluminum. As a result, a concentration distribution is formed where the molybdic acid ion concentration is higher in the central part of the carrier. Finally, when this alumina carrier is impregnated with potassium hydroxide, the potassium ions (cations) are electrostatically attracted by the phosphoric acid ions that are adsorbed on the outside surface of the alumina carrier and it appears that therefore, the potassium is distributed in the peripheral part of the carrier to a high concentration. The catalyst of the present invention is formed in this way. It is important here that a distribution first be formed where the phosphoric acid ions are present at a high concentration in the peripheral part surface. Furthermore, a catalyst structure as in the present invention where molybdenum is present at a high concentration in the central part of the catalyst is not realized by the method in the examples in above-mentioned Japanese Patent Application Laid-Open No. 9-240094 because the molybdenum is supported on the carrier before the phosphoric acid compound is supported.

The impregnation in the present invention can be performed in one step, two steps, or three steps. When it is performed in three steps, the carrier is first impregnated with supporting solution comprising phosphoric acid compound, then is impregnated with supporting solution comprising hydrogenation active metal element component, and finally is impregnated with supporting solution comprising potassium compound. When impregnation is performed in 2 steps, the carrier is impregnated with the hydrogenation active metal element component being contained in the first and/or last supporting solution. Furthermore, impregnation can also be the performed in one step with these three components comprising the same supporting solution. For instance, by means of the above-mentioned example, phosphoric acid compound, molybdic acid compound, and potassium salt can be simultaneously supported on an aluminum carrier. It appears that in this case, the concentration distribution of potassium and molybdenum in accordance with the present invention is formed in the catalyst because of the strong adsorption of the phosphoric acid compound on the aluminum carrier. The necessary concentration distribution cannot be obtained if the first impregnating supporting solution does not contain phosphoric acid compound or if the last impregnating supporting solution does not contain potassium. It is preferred that one-step or two-step impregnation be used in order to simplify the process. Furthermore, examples of the phosphoric acid compound that may be used are phosphoric acid, potassium hydrogen phosphate, pyrophosphoric acid, phosphoric acid salt, condensed phosphoric acid salt, etc., and precursor that produces a phosphoric acid compound in the supporting solution may also be used. Potassium salts, etc., may be used as the potassium compound.

It is preferred that the hydrogenation active metal element components are contained in anions in the supporting solution. Ammonium heptamolybdate, ammonium metatungstate and precursors that form such anions can be used as this type of compound.

In this method, once the carrier has been impregnated by the solution comprising phosphoric acid compound (depending on the case, and further comprising hydrogenation active metal element component), it is usually dried for 5 minutes to 24 hours within a temperature range of 50 to 180° C., preferably 80 to 150° C. Then, once the carrier has been impregnated with the solution comprising potassium compound (depending on the case, and further comprising hydrogenation active metal component), it is usually dried and baked. It is preferred that this drying be for 10 minutes to 24 hours within a temperature range of 50 to 180° C., particularly 80 to 150° C. Moreover, baking after impregnation is performed within a temperature range of 400 to 600° C., particularly 450 to 550° C. The suitable temperature elevation time up to the baking temperature is 10 to 240 minutes and the suitable retention time at the baking temperature is 1 to 240 minutes.

It is preferred that the catalyst according to the production method of the present invention contain 0.2 to 5 wt %, particularly 0.2 to 1 wt %, phosphorus as a constituting component of the catalyst. Moreover, as with the above-mentioned potassium distribution in the catalyst, it is preferred that when the concentration of phosphorus in the peripheral part is Po and the concentration of phosphorus in the central part is Pi in the cross section of the catalyst pellet, the Pi/Po value be within a range of 0 to 0.8, particularly within a range of 0 to 0.6, in order to more selectively distribute the potassium in the peripheral part of catalyst. On the other hand, the distribution of the hydrogenation active metal is the opposite of the potassium and phosphorus, with the concentration of hydrogenation active metal in the peripheral part being lower than the concentration of the hydrogenation active metal near the center.

It is preferred that specific surface area of the catalyst of the present invention be 1 to 450 m$^2$/g, particularly 2 to 300 m$^2$/g, pore volume be 0.1 to 2 cc/g, particularly 0.3 to 1.5 cc/g, and average pore diameter be 50 to 400 Å, particularly 70 to 300 Å. Moreover, it is preferred that the shape of the catalyst be spherical, cylindrical, trilobular, quadrilobular, etc., and when it is spherical or cylindrical, its radius should be 0.3 to 1.8 mm.

The catalyst of the present invention is used for hydrorefining of hydrocarbon oils, such as petroleum oils. Petroleum distillates, such as a gas oil, heavy oil, atmospheric distillation residue, vacuum distillation residue, etc., and crude oil may be given as examples of petroleum oil. However, heavy oil, and particularly those containing distillation residue such as asphaltene content, etc., are suitable. Examples of this type of heavy oil are crude oil, atmospheric distillation residue, vacuum distillation residue, coal liquefaction oil, shell oil, tar sand, etc., and the 50% distillation temperature is usually 450° C. or higher. The present invention is particularly ideal for heavy oil containing 10 ppm by weight or more, particularly 20 ppm by weight or more, in terms of nickel and vanadium element contents of compounds with a molecular weight of 3,000 or higher (polystyrene basis molecular weight by in GPC analysis) containing hetero elements such as sulfur, nitrogen, vanadium, nickel, iron, etc.

Hydrocarbon oil containing 2 wt % or more, particularly 5 wt % or more, asphaltene content are ideal as the subject of hydrorefining of the present invention because they contain large amounts of hetero compounds with a relatively high molecular weight. This asphaltene content is defined as heptane insoluble content and is determined by, for instance, the IP143 testing method of the Institute of Petroleum of London (Standard Methods for Analysis and Testing of Petroleum and Related Products IP143: Asphaltenes (Heptane Insolubles) in Petroleum Products).

As the preferred treatment conditions for hydrorefining heavy oil using the catalyst of the present invention, a temperature should be within a range of 250 to 500° C., particularly 300 to 450° C., a pressure should be within a range of 1 to 30 MPa, particularly 5 to 20 MPa, a hydrogen/oil ratio should be with a range of 50 to 5000 NL/L, particularly 500 to 2,000 NL/L, and a liquid space velocity (LHSV) should be within a range of 0.1 to 10 hr$^{-1}$, particularly 0.5 to 5 hr$^{-1}$.

It is preferred that the product oil that has been hydrorefined using the hydrorefining catalyst of the present invention be further hydrorefined using another demetalizing catalyst or desulfurizing catalyst. In this case, hydrorefining can also be performed by packing the catalyst of the present invention into the upstream in the reactor and packing another catalyst into the downstream in the reactor, and multi-step hydrorefining may also be performed with 2 or more reactors. The other demetalizing catalyst or desulfurizing catalyst may be a hydrorefining catalyst that is essentially free of potassium where hydrogenation active metal element is supported on a porous inorganic oxide carrier. Moreover, demetalizing treatment may also be performed before hydrorefining by the present invention. That is, the catalyst of the present invention may be used in any order in combination with another catalyst during the hydrorefining processes.

EXAMPLE 1 AND COMPARATIVE EXAMPLES 1 AND 2

The hydrorefining catalyst and the method of its production therefor according to the present invention will now be concretely described with examples. However, the present invention is not limited to these examples.

Example 1

Preparation of Catalyst A 150 g porous alumina carrier that had been formed into a cylinder with a diameter of 1.3 mm and a length of 2 to 3 mm were impregnated by spraying with an aqueous solution (volume equivalent to the volume of absorbed water of the carrier), which had been prepared by dissolution of 8.88 g ammonium heptamolybdate and 5.09 g phosphoric acid and drying for 6 hours at 130° C. The dried alumina carrier was then impregnated by spraying with an aqueous solution (volume equivalent to the volume of absorbed water of the carrier), which had been prepared by dissolution of 1.48 g potassium hydroxide, and then dried for 6 hours at 130° C. Temperature was then raised up to 500° C. over a 30-minute period in a rotary kiln and baking was performed in this state for 30 minutes to prepare Catalyst A.

Comparative Example 1

Preparation of Catalyst B 150 grams of the same porous alumina carrier as Catalyst A were impregnated by spraying with an aqueous solution (volume equivalent to the volume of absorbed water of the carrier), which had been prepared by dissolution of 8.88 g ammonium heptamolybdate, and dried for 6 hours at 130° C. The dried alumina carrier was impregnated by spraying with an aqueous solution (volume equivalent to the volume of absorbed water of the carrier), which had been prepared by dissolution of 5.09 g phosphoric acid and 1.48 g potassium hydroxide. Then, as with Catalyst A, temperature was raised to 500° C. over a 30-minute period and baking was performed in this state for 30 minutes to prepare Catalyst B.

Comparative Example 2

Preparation of Catalyst C 150 grams of the same porous alumina carrier as Catalyst A were impregnated by spraying as in the example with an aqueous solution (volume equivalent to the volume of absorbed water of the carrier), which had been prepared by dissolution of 7.77 g ammonium molybdate, and dried for 6 hours at 130° C. Then, as with Catalyst A, temperature was raised to 500° C. over a 30-minute period and calcination was performed in the state to prepare Catalyst C.

[Determination of Catalyst Properties]

The properties of Catalysts A, B, and C that were obtained above are shown in Table 1. Surface area, pore volume, and average pore diameter were determined with the ASAP2400 made by Micromeritix Co. Ltd.

TABLE 1

| Catalyst | Composition (wt %) | | | | Surface area (m/g) | Pore volume (mL/g) | Average pore diameter (Å) |
| --- | --- | --- | --- | --- | --- | --- | --- |
| | Al | Mo | K | P | | | |
| A | 48.4 | 2.88 | 0.44 | 0.93 | 183 | 0.881 | 170 |
| B | 48.6 | 2.91 | 0.41 | 0.92 | 188 | 0.897 | 168 |
| C | 49.1 | 2.98 | — | — | 191 | 0.896 | 173 |

Figure 1:
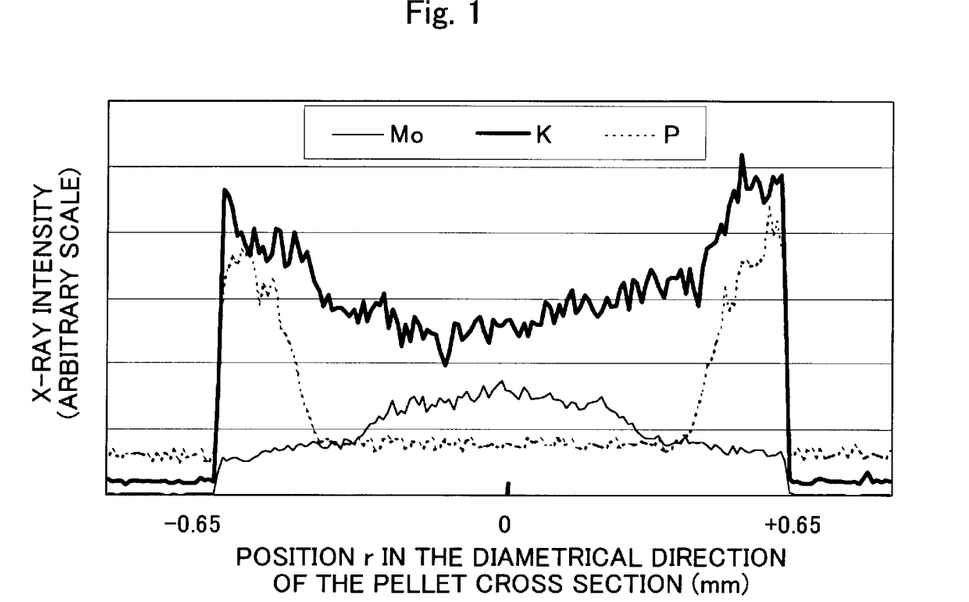
FIG. 1 is a drawing showing the results of EPMA analysis of the pellet cross section of catalyst A. In the figure, K represents the intensity of potassium, Mo represents the intensity of molybdenum, and P represents the intensity of phosphorus.
Figure 2:
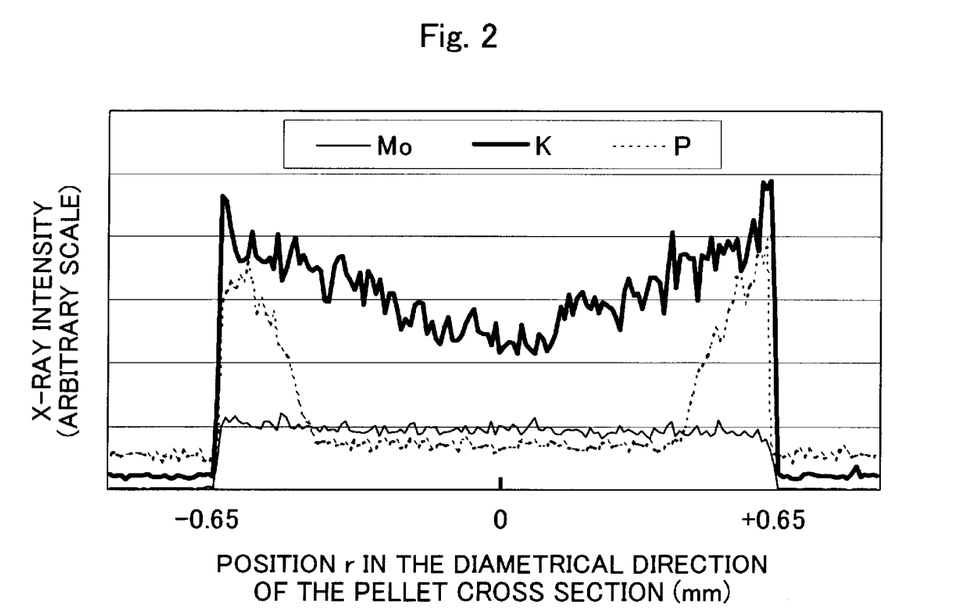
FIG. 2 is a drawing showing the results of EPMA analysis of the pellet cross section of catalyst B.
Figure 3:
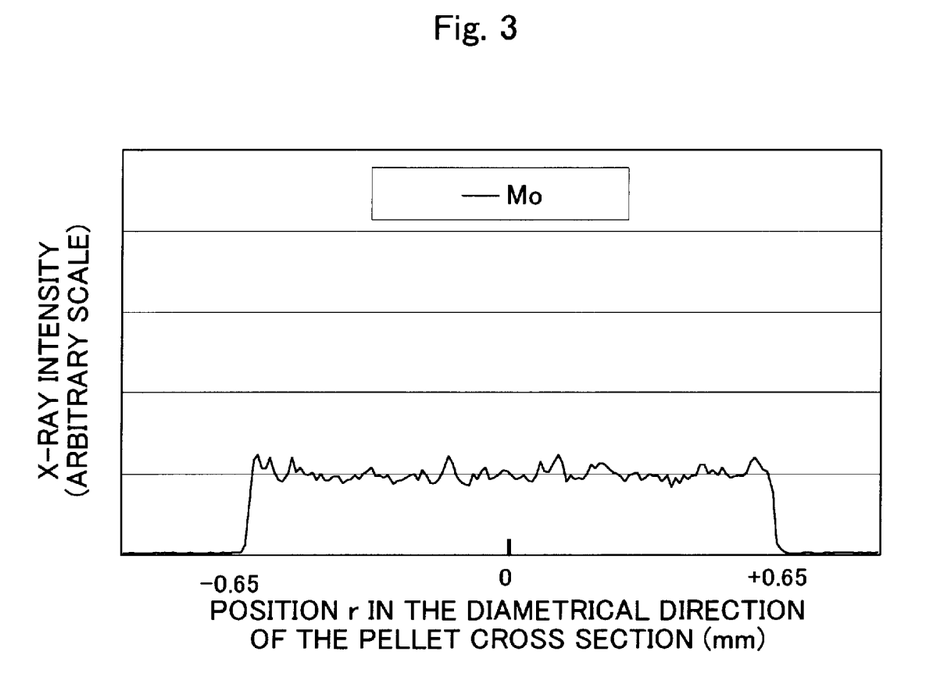
FIG. 3 is a drawing showing the results of EPMA analysis of the pellet cross section of catalyst C.

Moreover, the results of EPMA analysis in the diametrical direction of the cross section perpendicular to the axis of rotation of the pellet of Catalyst A, Catalyst B, and Catalyst C are shown in FIG. 1, FIG. 2, and FIG. 3, respectively. The determination interval for EPMA analysis was 0.01 mm. That is, the above-mentioned pellet was cut into 130 sections in its diametrical direction and element concentration of each section was analyzed. It is clear based on these results that catalyst A has a higher molybdenum concentration in the central part than in the peripheral part of the pellet and has a higher potassium concentration and phosphorus concentration in the peripheral part than in the central part of the pellet. It is obvious here that in terms of the detected intensity distribution by EPMA analysis showed in FIG. 1, the maximum molybdenum concentration is near the center of the pellet (near r=0 mm). Moreover, when the integrals of X-ray intensity in the detected intensity distribution were calculated for a variety of ranges, it was clear that the ratio Ao/Ai of the molybdenum concentration Ao in the region of 0.2R (approximately 0.52≦r≦approximately 0.65 mm) from the outside surface of the pellet cross section and the molybdenum concentration Ai in the region of a distance of 0.2R (0≦r≦approximately 0.13 mm) from the center of the pellet to is 0.40.

Furthermore, it is clear that the maximum potassium concentration is seen in the peripheral part of the pellet (r=approximately 0.65 mm). Moreover, it was shown that the ratio Ki/Ko between the potassium concentration Ki in the region of up to 0.2R (r=0.13 mm) from the center of the pellet cross section and the potassium concentration Ko in the region of a-distance of 0.2R (approximately 0.52 5 r≦approximately 0.65 mm) from the outside surface of the pellet is 0.32.

In contrast to this, with respect to potassium, Catalyst B has a higher concentration of potassium and phosphorus in the peripheral part than in the central part of the pellet, but as shown in FIG. 2, the molybdenum content is approximately uniform throughout the pellet. It is clear from the detected intensity distribution by EPMA shown in FIG. 2 that the ratio Ao/Ai of the molybdenum concentration Ao in the region of 0.2R from the outside surface of the pellet cross section and the molybdenum concentration Ai in the region of a distance of 0.2R from the center of the pellet is 0.98. It is further clear with respect to the potassium concentration that the maximum concentration is in the peripheral part of the pellet (r=approximately 0.65 mm). In addition, it is clear that the ratio Ki/Ko of the potassium concentration Ki in the region of up to 0.2R (r=0.13 mm) from the center of the pellet and the potassium concentration Ko in the region of a distance of 0.2R (approximately 0.52 5≦r≦approximately 0.65 mm) from the outside surface of the pellet is 0.60. Moreover, as is clear from FIG. 3, the molybdenum content is almost uniform throughout the pellet of Catalyst C.

[Performance tests]

The properties of Catalyst A and Catalyst B that were prepared as previously described were compared using a fixed-bed continuous flow reactor. 100 milliliters catalyst were packed into the reactor with an inner diameter of 30 mm and length of 1 m and hydrogenation was performed under the reaction conditions shown in Table 2.

TABLE 2

| Hydrogen pressure | 12 MPa |
| --- | --- |
| LHSV | 1.0 hr$^{-1}$ |
| Hydrogen/oil ratio | 1000 NL/L |
| Reaction temperature | 380° C. |

The heavy oil used as the feed oil in the reaction was a mixture of the equivalent weight of middle east atmospheric distillation residue and vacuum distillation residue. Its properties are as shown in the following Table 3. Analysis of metal-containing hetero compounds in the heavy oil was performed by GPC-ICP analysis. The sample to be analyzed was fractionated by the difference in molecular weight GPC (gel permeation chromatography) and each hetero atom was quantitatively determined by ICP (ICP or ICP-AES: inductively coupled plasma-atomic emission spectroscopy, Seiko Electronics Co. Ltd., SPS-1500). Hetero-containing compounds with a molecular weight of equal to or more than 3,000 (molecular weight by polystyrene conversion in GPC analysis) containing vanadium and nickel contained 78 ppm by weight vanadium and nickel in terms of the element weight of the same.

TABLE 3

| Properties of feed oil | |
|---|---|
| Specific gravity (d15/4) | 1.0181 |
| Viscosity (100° C.) | 745 cSt |
| Sulfur content | 4.81 wt % |
| Nitrogen content | 0.372 wt % |
| Vanadium content | 130 wtppm |
| Nickel content | 43 wtppm |
| Asphaltene content | 10.0 wt % |

Figure 4:
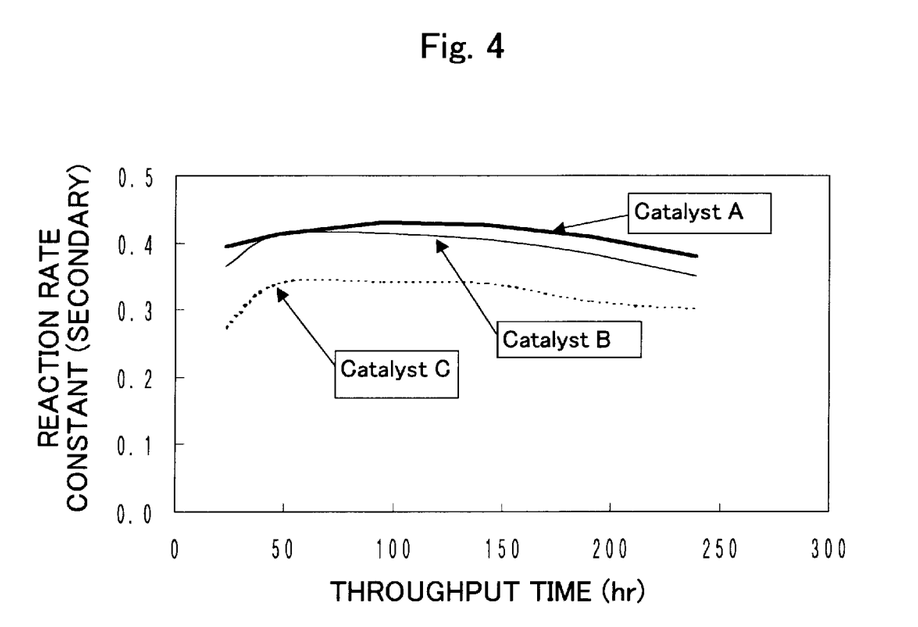
FIG. 4 is a graph showing the changes over time in the reaction rate constant of desulfurization obtained in performance tests of catalysts A, B, and C.
Figure 5:
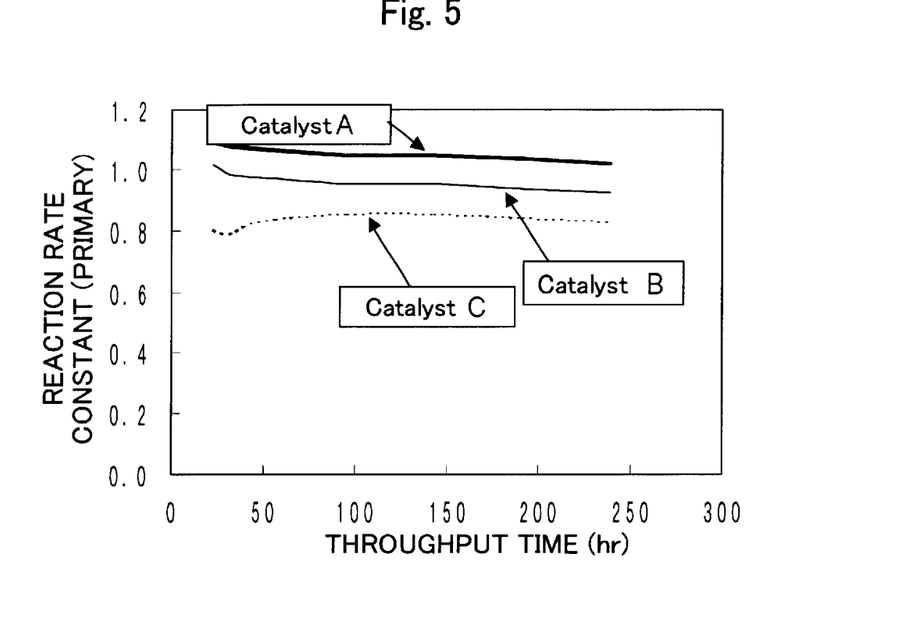
FIG. 5 is a graph showing changes over time in the reaction rate constant of demetalization obtained in performance tests of catalysts A, B, and C.

With respect to performance tests, after catalyst had been sulfurized with gas oil to which sulfurizing agent had been added, temperature was raised to the reaction temperature and the feed oil was passed through the catalyst. Changes in the reaction rate constant as calculated from the sulfur concentration and the metal (vanadium+nickel) concentration of the product oil that was obtained are shown in FIG. 4 (secondary reaction rate constant) and FIG. 5 (primary reaction rate constant). It was clear that when compared to Catalyst B and Catalyst C, Catalyst A has the highest desulfurizing and demetalizing activity and shows almost the same deactivation.

[Analysis of Catalysts Used in Performance tests]

Figure 6:
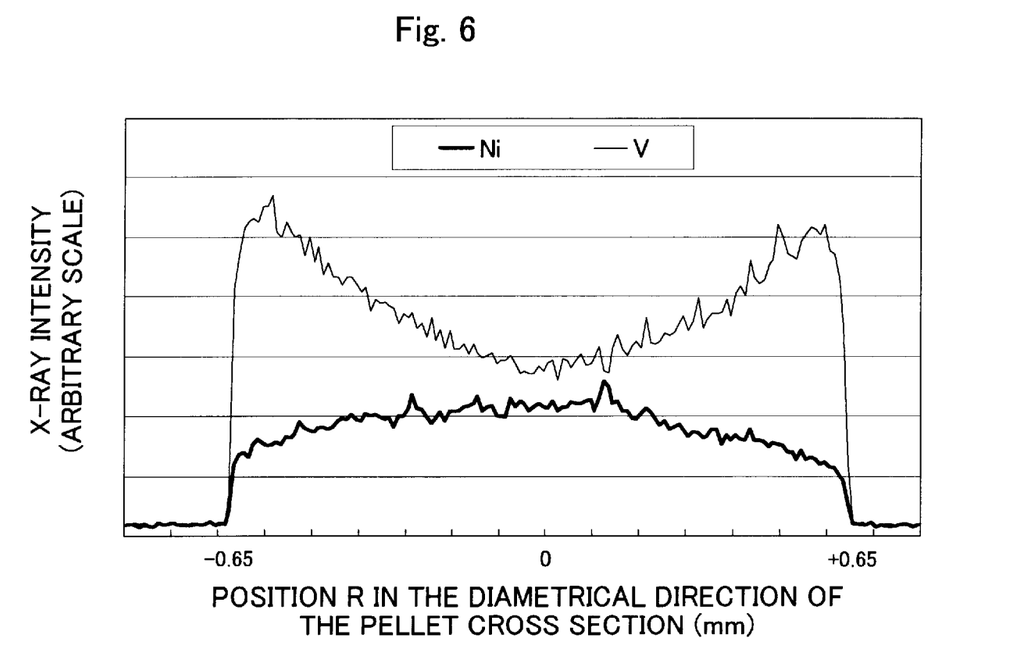
FIG. 6 is a drawing showing the results of EPMA analysis of the pellet cross section of spent catalyst A used in the performance tests. Ni represents the X-ray intensity of nickel and V represents the X-ray intensity of vanadium.
Figure 7:
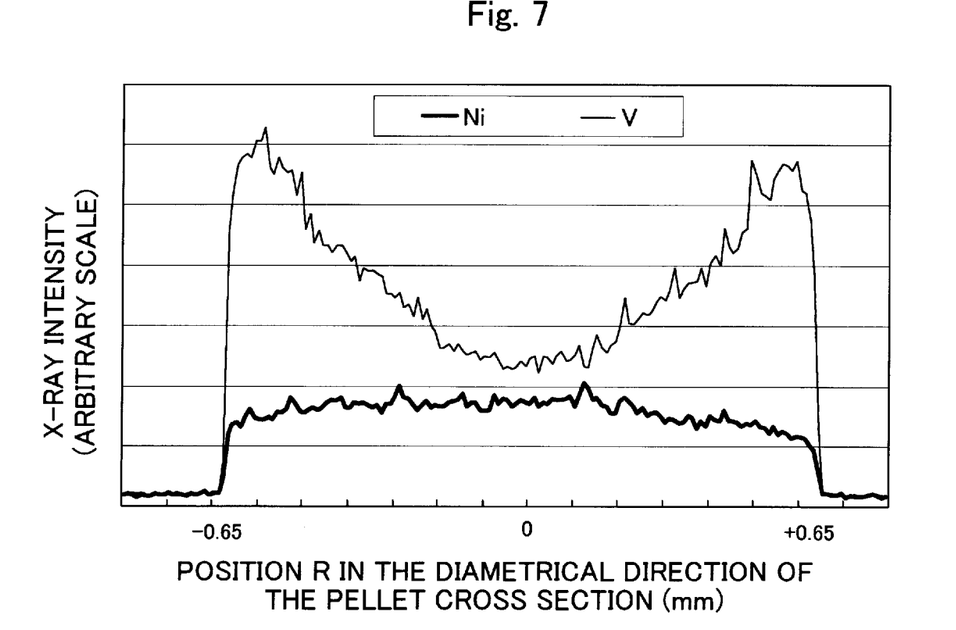
FIG. 7 is a drawing showing the results of EPMA analysis of the pellet cross section of the catalyst B used in the performance tests. Ni represents the X-ray intensity of nickel and V represents the X-ray intensity of vanadium.
Figure 8:
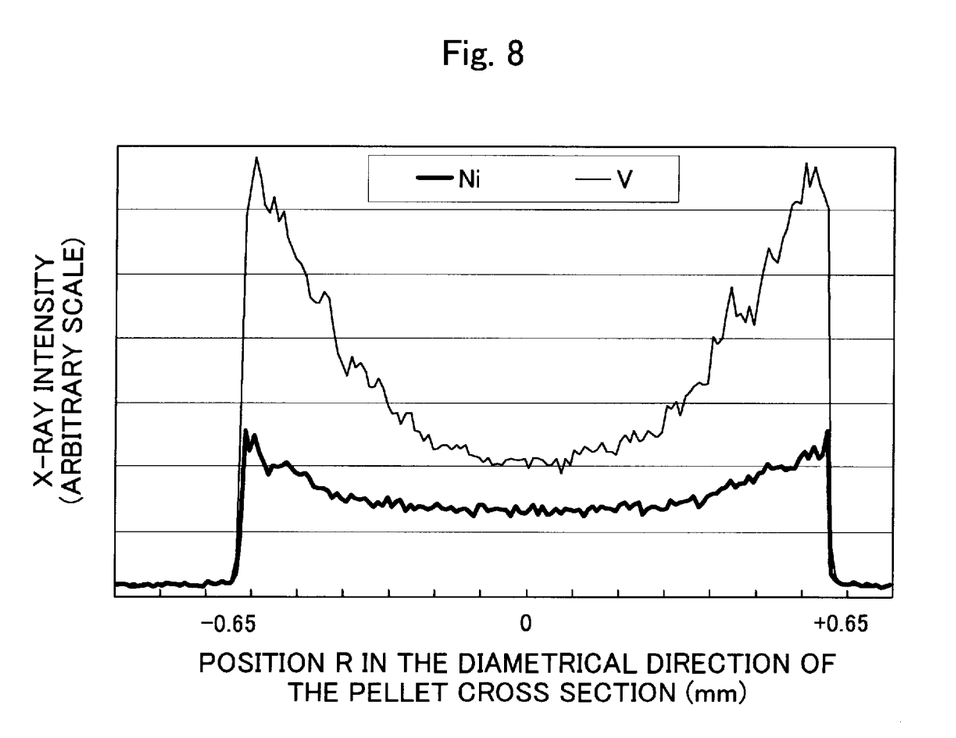
FIG. 8 is a drawing showing the results of EPMA analysis of the pellet cross section of the catalyst C used in the performance tests. Ni represents the X-ray intensity of nickel and V represents the X-ray intensity of vanadium.
Figure 9:
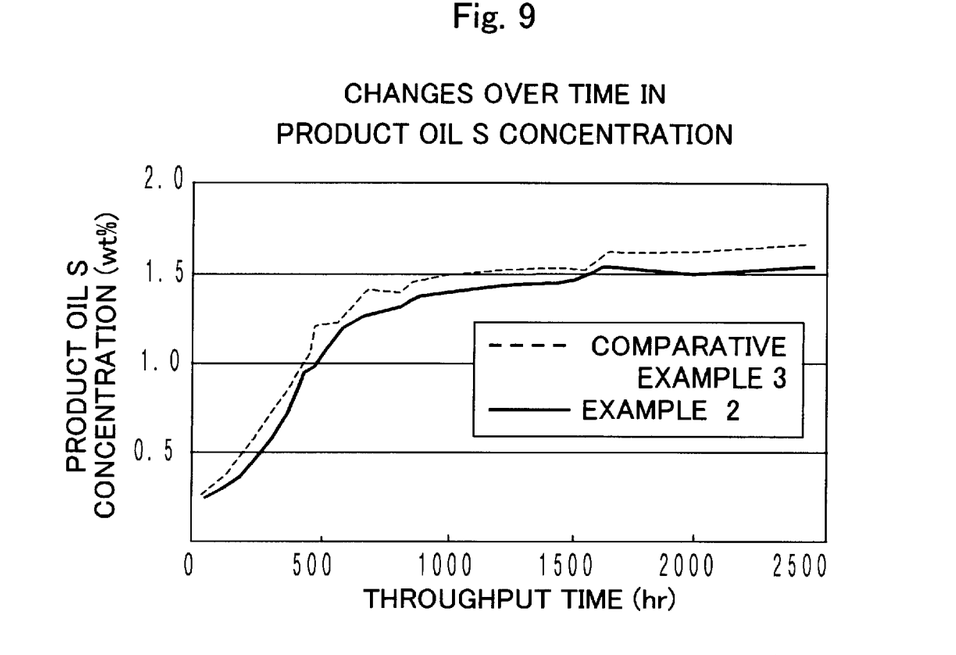
FIG. 9 is a graph showing changes over time in the sulfur concentration of the product oil that was produced by a multi-bed catalytic reaction tower in Example 2 and Comparative Example 3.
Figure 10:
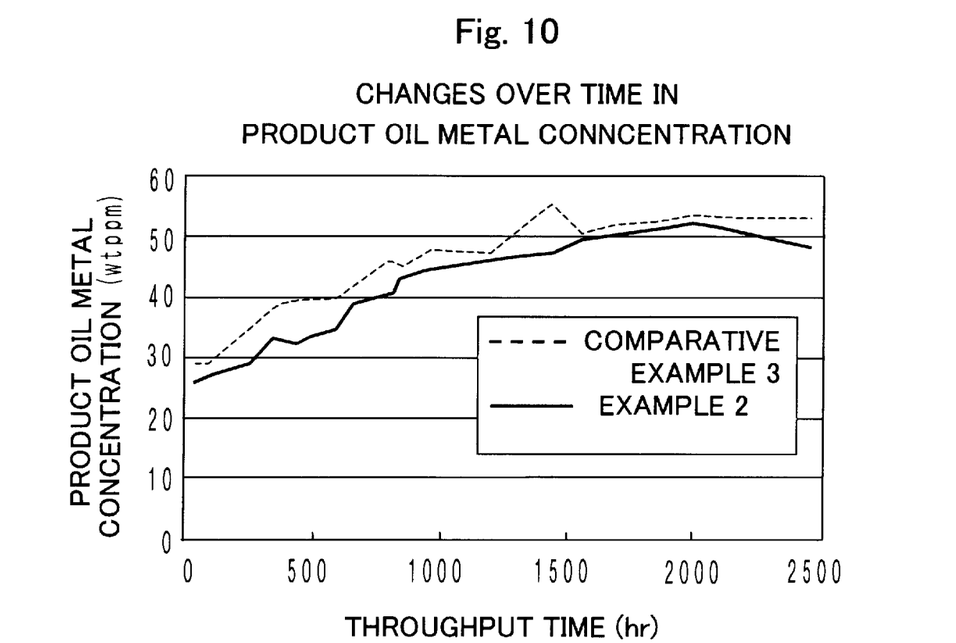
FIG. 10 is a graph showing changes over time in metal (vanadium+nickel) in the product oil that was produced by a multi-bed catalytic reaction tower in Example 2 and Comparative Example 3.

The results of EPMA analysis of the pellet cross section in the diametrical direction of Catalyst A, Catalyst B, and Catalyst C are shown in FIG. 6, FIG. 7, and FIG. 8, respectively. X-ray intensity in FIG. 6, FIG. 7, and FIG. 8 is on arbitrary scale, but each zone is represented by the same scale. It is clear from the profile of vanadium in each figure that more vanadium is diffused to the inside the pellet with Catalyst A. Moreover, it is clear from the profile of nickel in each graph that the percentage of nickel that accumulates on the inside rather than the outside of the pellets is relatively high with Catalyst A when compared to Catalyst B and the opposite is true from the profile of Catalyst C. Based on these results, it is clear that when compared to conventional catalysts (Catalyst B and Catalyst C), the metal content more efficiently accumulates on the inside of the pellet with the catalyst of the present invention (Catalyst A). This is based on the fact that, as previously mentioned, the hydrogenation active metal concentration is substantially higher in the central part of the catalyst than in the peripheral part with the catalyst according to the present invention.

Example 2

Next, life tests of catalysts were performed by charging the catalyst of the present invention produced in Example 1 in a hydrorefining system. A catalytic reaction tower consisting of 2 reactors of fixed beds was used as the hydrorefining system. The first reactor had an inner diameter of 30 mm and a length of 1 m and was packed with 60 ml of Catalyst A that had been produced in Example 1. The second reactor had an inner diameter of 30 mm and a length of 1 m and was packed with 140 ml of Catalyst D mainly for desulfurization. Catalyst D was made as follows:

[Method of Producing Catalyst D]

150 grams porous alumina carrier that had been formed into a cylinder with a diameter of 0.8 mm and the length of 2 to 3 mm (different carrier than Catalyst A and Catalyst B) were impregnated by spraying with an aqueous solution (volume equivalent to the volume of absorbed water of the carrier), which had been prepared by dissolution of 26.2 g ammonium molybdate, and dried for 6 hours at 130° C. The dried alumina carrier was impregnated by spraying with an aqueous solution (volume the equivalent to the volume of absorbed water of the carrier), which had been prepared by dissolution of 19.5 grams nickel nitrate hexahydrate, and dried for 6 hours at 130° C. Then temperature was raised up to 500° C. over a 30-minute period in a rotary kiln and baking was performed in this state for 30 minutes to obtain Catalyst D with the properties shown in the following Table 4:

TABLE 4

| Properties of Catalyst D | | |
|---|---|---|
| Composition (wt %) | Al | 42.0 |
| | Mo | 7.9 |
| | Ni | 2.4 |
| Surface area (m²/g) | | 220 |
| Pore volume (mL/g) | | 0.63 |
| Average pore diameter (Å) | | 95 |

Long-term catalyst life tests for approximately 2,500 hours were conducted by passing feed oil with the properties shown in the following Table 5 through the above-mentioned catalytic reaction tower. The sulfur concentration and the metal concentration of the product oil were determined 50 hours and approximately 2,500 hours after starting the tests. The operating conditions of these tests are shown below in Table 6:

TABLE 5

| Properties of feed oil | |
|---|---|
| Specific gravity (d15/4) | 1.030 |
| Viscosity (100° C.) | 1215 cSt |
| Sulfur content | 5.71 wt % |
| Nitrogen content | 0.36 wt % |
| Vanadium content | 136 wtppm |
| Nickel content | 53 wtppm |
| Asphaltene content | 11.8 wt % |

TABLE 6

| Operating conditions | |
|---|---|
| Hydrogen pressure | 12 MPa |
| LHSV (as a whole) | 0.30 hr$^{-1}$ |
| Hydrogen/oil ratio | 570 NL/L |
| Reaction temperature | 390° C. |

The long-term catalyst life tests of approximately 2,500 hours were conducted with the same catalytic reaction tower and the same operating conditions as in Example 2, except that the fact that Catalyst C produced in Comparative Example 1 was charged in the first reactor of the catalytic reaction tower.

The test results of above-mentioned Example 2 and Comparative Example 3 are shown in the following Table 7:

TABLE 7

| Reaction time | | Example 2 | Comparative Example 3 |
|---|---|---|---|
| 50 hours | Sulfur concentration wt % | 0.247 | 0.290 |
| | Metal concentration wt % | 26 | 29 |
| 2,500 hours | Sulfur concentration wt % | 1.546 | 1.675 |
| | Metal concentration wt % | 48 | 53 |

As is clear from above-mentioned Table 7, when compared to the reaction tower of Comparative Example 3, the reaction tower of Example 2 produced oil with a low sulfur and metal concentration at the initial stage of the operation. It is clear that even with long-term operation for 2,500 hours, the reaction tower of Example 2 of course retained its excellent desulfurizing and demetalizing capability. Consequently, long-term hydrorefining of feed oil at a high refining efficiency is possible by using the catalyst of the present invention in combination with another catalyst in a multi-bed catalytic reaction tower or catalyst system.

The present invention was explained in concrete terms using examples. However, the present invention is not limited to these examples. In particular it is clear that although alumina carrier was impregnated with ammonium molybdate and phosphoric acid and then impregnated with potassium hydroxide during the process of catalyst production in Example 1, the catalyst structure of the present invention is obtained, even i) in that case where carrier is first impregnated with phosphoric acid, is then impregnated with ammonium molybdate, and is finally impregnated with potassium hydroxide, ii) in the case where carrier is first impregnated with phosphoric acid, is then impregnated with potassium hydroxide, and is finally impregnated with ammonium molybdate, iii) in the case where carrier is first impregnated with phosphoric acid and is then simultaneously impregnated with ammonium molybdate and potassium hydroxide, iv) in the case where carrier is first impregnated with phosphoric acid and potassium hydroxide and is then impregnated with ammonium molybdate, and v) the case where carrier is simultaneously impregnated with phosphoric acid, ammonium molybdate, and potassium hydroxide. In contrast to this, it was not possible to obtain a structure where the potassium was distributed to a high concentration in the peripheral part of the catalyst when the carrier was not impregnated with the phosphoric acid first. It was clear in particular that a structure where the molybdenum was distributed to a high concentration in the central part of the catalyst could not be obtained when a carrier was impregnated with only phosphoric acid during the final process.

Catalytic activity can be improved and life can be prolonged with the catalyst of the present invention by reducing molecular weight of the hetero element (sulfur, vanadium, nickel, etc.)-containing compounds in the peripheral part of the catalyst and hydrorefining the hetero element-containing compounds of reduced molecular weight in the central part of the catalyst. Consequently, even though the catalyst of the present invention have high desulfurizing and demetalizing activity, a reduction in activity is inhibited to obtain excellent hydrorefining activity, making the catalyst of the present invention very useful for hydrorefining of heavy oil, such as atmospheric distillation residue and vacuum distillation residue, with a high metal content.

What is claimed is:

1. A hydrorefining catalyst, comprising:
   a carrier formed of porous inorganic oxide;
   0.1 to 25 wt % of at least one hydrogenation active metal element selected from a group consisting of elements of Group 6, Group 8, Group 9, and Group 10 of the Periodic Table; and
   0.1 to 3 wt % of potassium,
      wherein concentration distribution of the hydrogenation active metal element is higher in a central part than in a peripheral part of the catalyst and,
      concentration distribution of the potassium is higher in the peripheral part than in the central part of the catalyst.

2. A hydrorefining catalyst according to claim 1, wherein a distance from an outside surface to a center of the catalyst is 0.3 to 1.8 mm.

3. A hydrorefining catalyst according to claim 1, wherein the catalyst contains 2 to 15 wt % of the hydrogenation active metal element and 0.1 to 3 wt % of the potassium.

4. A hydrorefining catalyst according to claim 1, wherein, when R represents a distance from an outside surface to a center of the cross section of the catalyst, the position of maximum potassium concentration is located within a region of distance of 0.5R from the outside surface.

5. A hydrorefining catalyst according to claim 1, wherein the catalyst has such concentration distribution that the hydrogenation active metal element concentration Ao in the peripheral part of the catalyst is less than 0.8-fold the hydrogenation active metal element concentration Ai in the central part of the catalyst, and the potassium concentration Ki in the central part of the catalyst is less than 0.8-fold the potassium concentration Ko in the peripheral part of the catalyst.

6. A hydrorefining catalyst according to claim 1, further comprising phosphorus.

7. A hydrorefining catalyst according to claim 6, wherein the phosphorus is distributed more in the peripheral part than in the central part of the catalyst.

8. A hydrorefining catalyst according to claim 1, wherein the hydrogenation active metal element is molybdenum or tungsten.

9. A method of producing the hydrorefining catalyst of claim 1 comprising the steps of:
   impregnating a porous inorganic oxide carrier with a phosphoric acid compound;
   impregnating the porous inorganic oxide carrier with a potassium compound; and
   impregnating the porous inorganic oxide carrier with at least one hydrogenation active metal element selected from a group consisting of elements of Group 6, Group 8, Group 9 and Group 10 of the Periodic Table,
      wherein the step of impregnation with the phosphoric acid compound is performed first or simultaneously with the other two steps, or the step of impregnation with the phosphoric acid compound is performed simultaneously with one of the two steps and before the other of the two steps.

10. A production method according to claim 9, wherein the carrier is impregnated with a phosphoric acid compound and the hydrogenation active metal element, and then impregnated with the potassium compound.

11. A production method according to claim 9, wherein the hydrogenation active metal element is molybdenum or tungsten.

* * * * *

UNITED STATES PATENT AND TRADEMARK OFFICE
CERTIFICATE OF CORRECTION

PATENT NO.    : 6,383,974 B1
DATED         : May 7, 2002
INVENTOR(S)   : Katsuaki Ishida et al.

It is certified that error appears in the above-identified patent and that said Letters Patent is hereby corrected as shown below:

<u>Title page,</u>
Item [30], Foreign Application Priority Data, please add the following priority application information:
-- Feb. 26, 1999     (JP) ................................... 11-049832 --.

Signed and Sealed this

Third Day of June, 2003

JAMES E. ROGAN
*Director of the United States Patent and Trademark Office*